(12) United States Patent
Ezzina

(10) Patent No.: US 10,689,163 B2
(45) Date of Patent: Jun. 23, 2020

(54) DOSING DEVICE TO EQUIP A CONTAINER AND CONTAINER INCLUDING SUCH A DEVICE

(71) Applicant: ALBEA SERVICES, Gennevilliers (FR)

(72) Inventor: Emir Ezzina, Montigny (FR)

(73) Assignee: ALBEA SERVICES, Gennevilliers (FR)

( * ) Notice: Subject to any disclaimer, the term of this patent is extended or adjusted under 35 U.S.C. 154(b) by 0 days.

(21) Appl. No.: 16/016,537

(22) Filed: Jun. 22, 2018

(65) Prior Publication Data
US 2018/0370690 A1    Dec. 27, 2018

(30) Foreign Application Priority Data
Jun. 22, 2017   (FR) ..................................... 17 55730

(51) Int. Cl.
| | |
|---|---|
| B65D 35/46 | (2006.01) |
| G01F 11/00 | (2006.01) |
| B65D 47/20 | (2006.01) |
| B05B 11/00 | (2006.01) |
| G01F 11/28 | (2006.01) |
| B05B 11/04 | (2006.01) |
| B65D 47/00 | (2006.01) |
| B65D 83/00 | (2006.01) |

(52) U.S. Cl.
CPC ............ *B65D 35/46* (2013.01); *B05B 11/007* (2013.01); *B05B 11/0072* (2013.01); *B05B 11/00412* (2018.08); *B05B 11/04* (2013.01); *B65D 47/00* (2013.01); *B65D 47/2031* (2013.01); *B65D 83/00* (2013.01); *G01F 11/006* (2013.01); *G01F 11/288* (2013.01); *B05B 11/3033* (2013.01); *B05B 11/3035* (2013.01)

(58) Field of Classification Search
CPC ............... B05B 11/007; B05B 11/0072; B05B 11/00412; B65D 35/46
USPC ................................ 222/207, 213, 406, 494
See application file for complete search history.

(56) References Cited

U.S. PATENT DOCUMENTS

| | | | | |
|---|---|---|---|---|
| 2,772,817 A | * | 12/1956 | Jauch ................... | A47K 5/1209 222/207 |
| 3,910,467 A | * | 10/1975 | Nilson ............... | B65D 47/2081 222/449 |

(Continued)

FOREIGN PATENT DOCUMENTS

| | | |
|---|---|---|
| WO | WO0037179 | 6/2000 |
| WO | WO2012171708 | 12/2012 |

*Primary Examiner* — Vishal Pancholi
(74) *Attorney, Agent, or Firm* — Steven M. Greenberg, Esq.; Shutts & Bowen LLP

(57) ABSTRACT

The invention relates to a dosing device designed to equip a container including a deformable reservoir containing a product. The device includes an insert that includes a dosing chamber that can be deformed by pressure from the product coming from the reservoir. The dosing chamber includes a top valve for the intake of the product from the reservoir, a bottom valve dispensing the product, and a deformable body connecting the top valve and the bottom valve. The dosing chamber is configured such that, under pressure from the product coming from the reservoir, the top valve is closed by the deformation of a first portion of the chamber, the bottom valve remaining closed, whereupon the bottom valve opens under the effect of the deformation of the body.

20 Claims, 9 Drawing Sheets

(56) References Cited

U.S. PATENT DOCUMENTS

| | | | | |
|---|---|---|---|---|
| 6,241,129 | B1 * | 6/2001 | Bonningue | G01F 11/263 222/207 |
| 6,341,718 | B1 * | 1/2002 | Schilthuizen | B05B 11/04 222/207 |
| 6,484,906 | B2 * | 11/2002 | Bonningue | G01F 11/04 222/207 |
| 8,596,501 | B2 * | 12/2013 | Hagleitner | A47K 5/1208 222/207 |
| 8,783,520 | B2 * | 7/2014 | Hagleitner | A47K 5/1208 222/181.1 |
| 8,794,488 | B2 | 8/2014 | Van Der Molen | |
| 2012/0024904 | A1 * | 2/2012 | Doulin | B05B 11/3035 222/207 |

\* cited by examiner

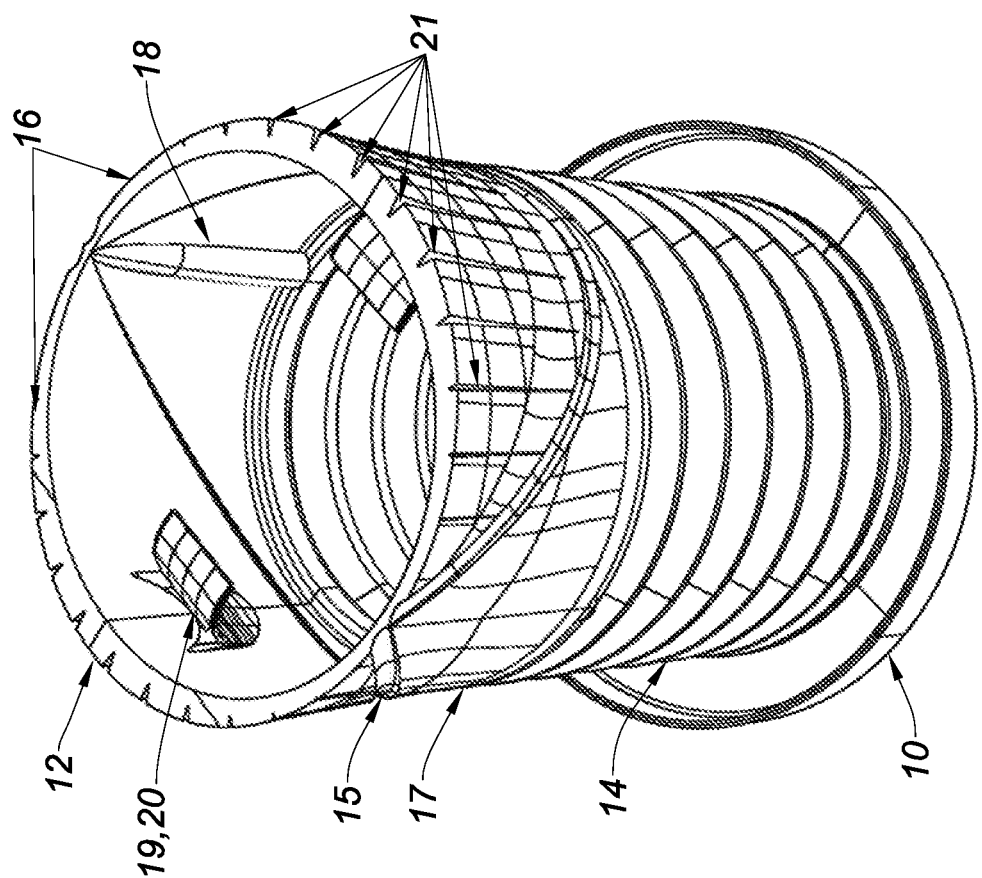
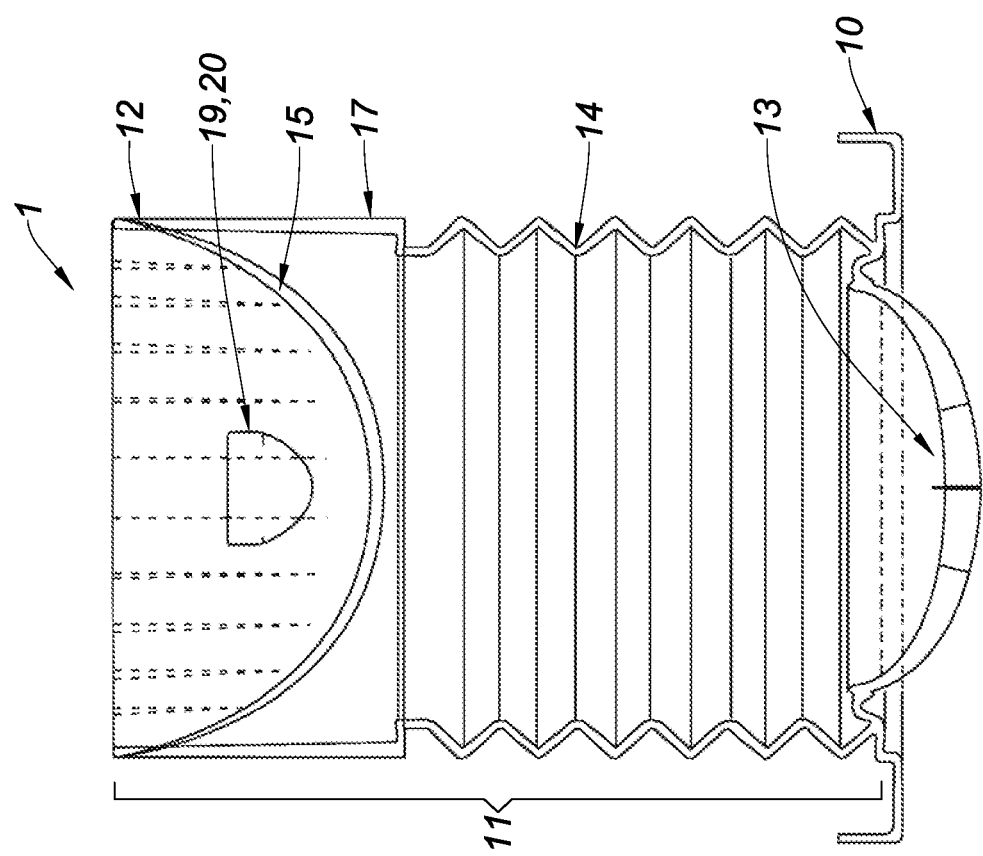
Fig. 3a
Fig. 3b

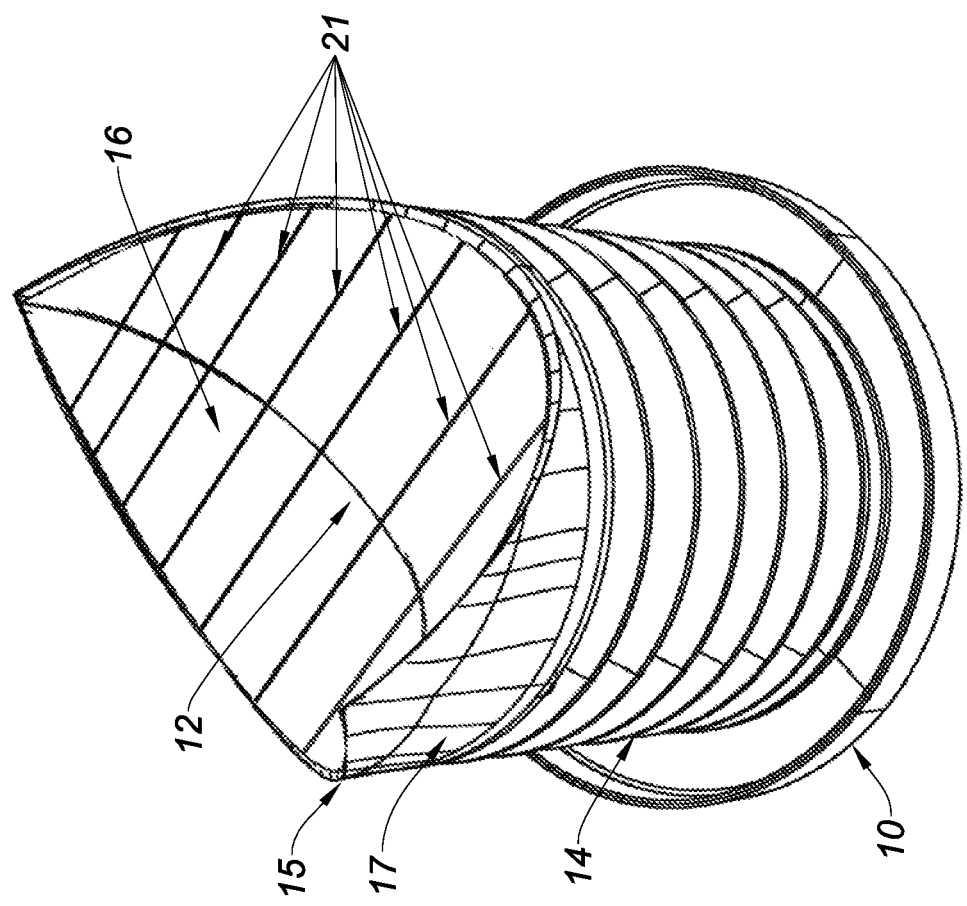
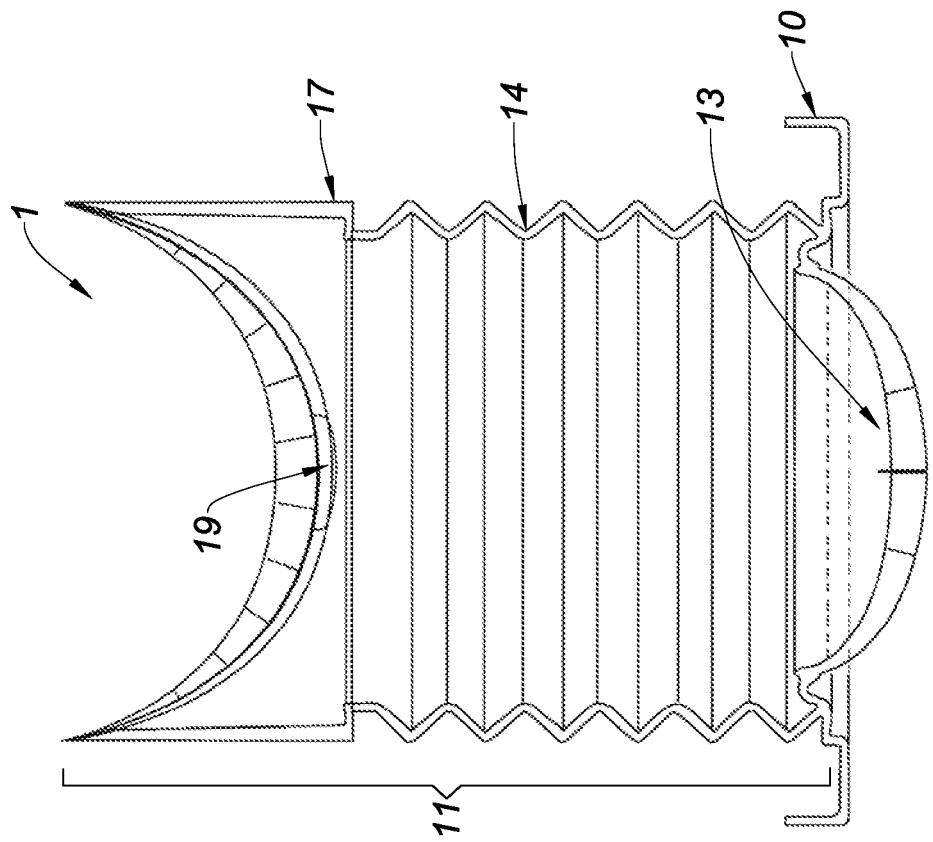

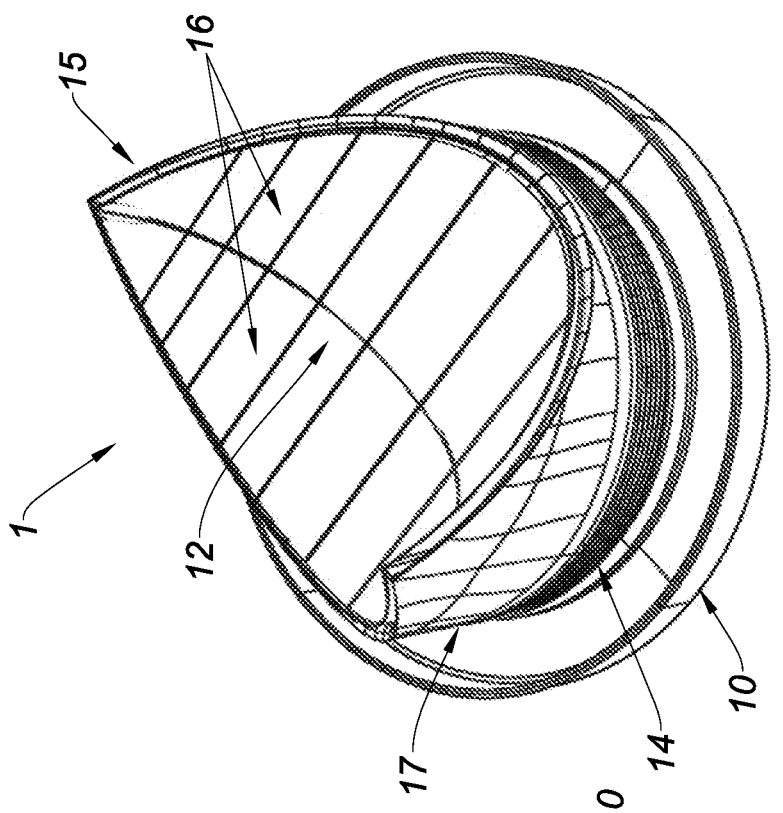
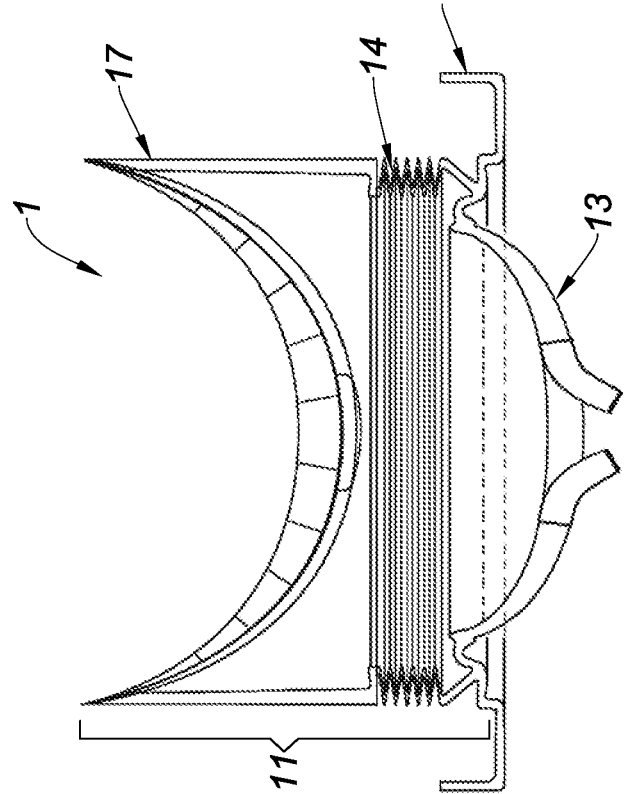
Fig. 5b
Fig. 5a

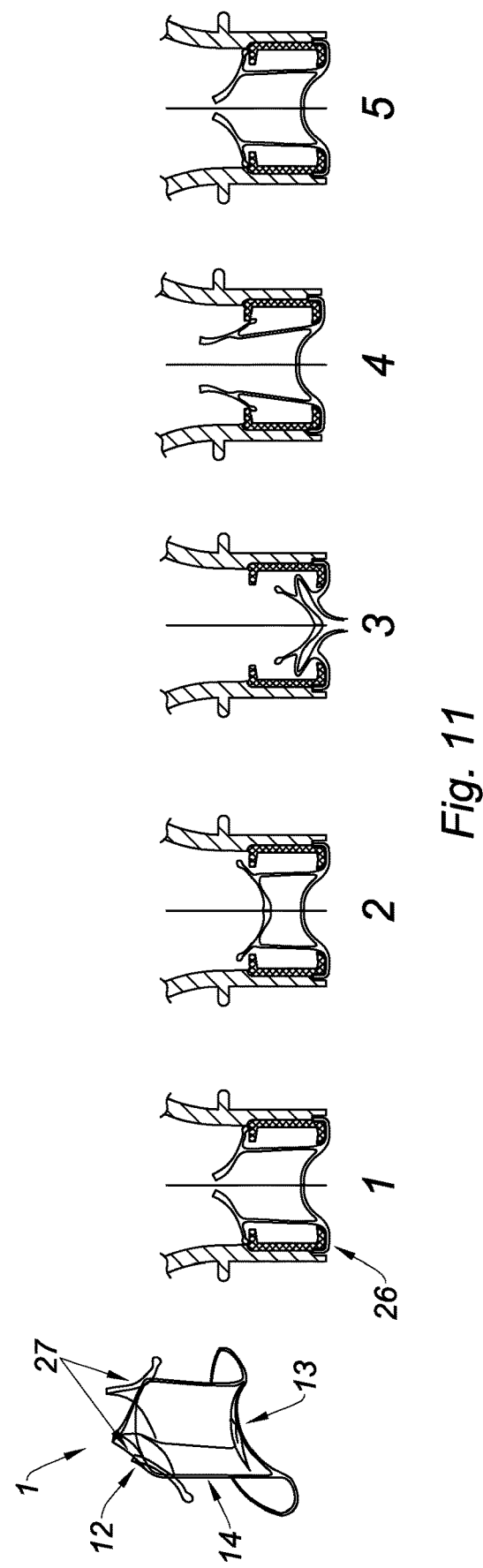

DOSING DEVICE TO EQUIP A CONTAINER AND CONTAINER INCLUDING SUCH A DEVICE

CROSS-REFERENCE TO RELATED APPLICATIONS

This application claims priority under 35 U.S.C. § 119(a) to French Patent Application No. 1755730, filed Jun. 22, 2017.

BACKGROUND OF THE INVENTION

Field of the Invention

The present invention relates to a dosing device and more particularly to a dosing device of a container with a deformable reservoir containing a product to be distributed.

Description of the Related Art

Devices for distributing a liquid or pasty food product are known, consisting of a flexible elastomer valve in the shape of a dome which is designed with a cross-shaped orifice included of two narrow slots that cross. Under the effect of pressure exerted on the reservoir and of the increase in pressure that follows inside the reservoir, the cross-shaped orifice opens leading to the distribution of the product contained in the reservoir.

The use of such valves has become widespread because they make it possible to protect the product contained in the reservoir from the outside environment and from possible contamination.

However, this type of valve does not allow for a repeatable dosing during the distribution of the product. Indeed, the distribution provided by this type of valve is highly dependent on the viscosity of the liquid to be distributed and on the pressure applied by the user.

Mention can be made, for example, of the change in viscosity observed when a container of sun cream is left in the sun. The decrease in the viscosity of the sun cream, caused by heating, leads to an increase in the distributed volume for an identical pressure exerted on the reservoir by the user, compared to the volume distributed when the product is not heated.

A deformable suction device is also known which allows for the distribution of product in place of and as a replacement for a conventional container neck. This device has a deformable hollow member including two chambers separated by a deformable circular partition, having a hole that allows the product to flow from one chamber to the other. The tip of the member includes an orifice including a slot or holes of small size which make it possible to dispense the product outside.

By exerting pressure on the device, the passage between the two chambers is cut off due to the closing of the hole located on the partition, and the air present in the chamber in communication with the opening orifice is flushed from the device, leaving the chamber in a partial vacuum. By releasing the pressure exerted on the device, the hole located on the partition opens, allowing the product contained in the reservoir to be sucked into the two chambers under the effect of the partial vacuum created by the downstream chamber. Further pressure on the device will be required in order for the product to be distributed. However, this device remains complex to use.

BRIEF SUMMARY OF THE INVENTION

Embodiments of the present invention address deficiencies of the art in respect to dosing devices and provide a novel and non-obvious dosing device which makes it possible to deliver a repeatable dose of a product contained in a reservoir regardless of the pressure exerted by the user on the reservoir and of the viscosity of the product, this using a simple operation. To this effect, according to a first aspect, the invention proposes a dosing device intended to equip a container that includes a deformable reservoir containing a product, the device including an insert including a dosing chamber that can be deformed by the pressure of the product coming from the reservoir. The dosing chamber includes:

a top valve for the intake of the product from the reservoir;
a bottom valve for the dispensing of the product;
a deformable body connecting the top valve and the bottom valve;

The dosing chamber is configured so that, under the pressure of the product coming from the reservoir, the top valve is closed by deforming a first portion of the chamber, the bottom valve remaining closed, then the bottom valve opens under the effect of the deformation of the body. The desired effect of repeated dosing is as such obtained, according to the invention, by using the pressure coming from the product contained in the reservoir. In other words, thanks to the configuration of the deformable chamber, particularly its various portions and the links established in their respective deformation, a simple pressure from the user on the reservoir is sufficient and the dose dispensed no longer depends on the pressure exerted or on the viscosity of the product.

Particularly, it should be noted that the top valve can close before the deformation of the body although such a sequencing is not necessary. As such, the deformable body can start to compress itself before the complete closing of the top valve, on condition that the bottom valve remains closed as long as the top valve is open. In other words, the dosing chamber is configured such that the top valve closes always with the same degree of deformation of the body. In other words, the dosing chamber is configured such that the bottom valve is remains closed when the top valve is open.

According to the various characteristics of the invention, which can be taken together or separately:

the dosing chamber is made of a single part,
the insert is made of a single part,
the chamber is configured such that the first portion is mobile with the body during the deformation of the body,
the chamber includes a second portion which is deformed before the deformation of the first portion,
the second portion of the chamber forms a dome, the bottom valve being on the dome,
the dosing chamber includes lines of weakness, the dosing chamber being deformable along the lines of weakness in order to form the first part of the chamber,
the lines of weakness are diametrically opposite each other,
the lines of weakness are two in number,
the first portion includes flaps that can be folded towards one another, delineated by the lines of weaknesses,
the lines of weakness are located on an inclined plane with respect to a longitudinal axis of the insert,
the flaps, at rest, are situated around a longitudinal axis,
the flaps are two in number,
the flaps are diametrically opposite each other, the flaps have a decreasing thickness from a free edge to the lines of weakness and/or from a median portion of the flaps to a rigid portion of the chamber, the rigid portion of the chamber is located between the flaps and the deformable body, the rigid portion includes tops located between two adjacent ends of the flaps, the tops are arranged such that they surmount a reinforcement line, the tops are diametrically opposite each other, each one of the flaps includes a deformable member located on its inner wall, the member being connected to the inner wall by a zone forming a hinge, the member is configured to be along the flaps, at rest, and to move away from the inner wall under the effect of a movement of the product in such a way as to deform the flaps on the lines of weakness, such that the flaps come into contact with one another, thereby closing the top valve and the dosing chamber, the flaps include grooves separating at rest each of the flaps into several especially parallel sections, allowing the flap to be deformed for the closing of the top valve, the grooves have an open angle at rest and an angle at 0° when the top valve is closed, in such a way that the closing of the top valve is maintained by blocking the grooves through compression, the body of the dosing chamber consists of a set of bellows, the bellows are cylindrical in shape, the bellows are decompressed at rest and compressed under the effect of the continuous pressure exerted on the reservoir, in such a way as to decrease the volume of the dosing chamber and dispense the dose of product contained in the latter, the dosing chamber also includes an edge that fastens the dosing chamber on the neck of the reservoir, the insert is made from elastomer material, particularly Polyethylene (PE), the insert, in particular the dosing chamber, comes from moulding.

According to other embodiments that can be combined with some of the characteristics mentioned hereinabove:

the dosing chamber includes lines of weakness arranged according to a longitudinal axis of the insert, the first portion of the chamber is made up of an edge slimming in the direction of the lines of weakness following a tapered line, the body has a zone that is thinner than the edge of the first portion, the zone is delineated by the edge of the first portion and the bottom valve, the zone is evenly shaped, the body is cylindrical, the edge of the chamber forms a connecting neck with the reservoir of the chamber, the edges of the first portion are diametrically opposite each other, the dosing chamber further includes an excess thickness between the body and the bottom valve, the body, at rest, has a straight shape in such a way as to allow the product to be inserted into the dosing chamber via the top valve, the body is deformed, under the effect of the pressure exerted by the product, from the edge of the first portion along the lines of weakness and the tapered line, the body being constrained by the zone of the excess thickness, the dosing chamber includes two opposite rigid parts, each rigid part having a hinge delimiting:
 a support branch, the support branch of a first of the parts being configured to be parallel to the support branch of the opposite rigid part by extending along the body; and
 a main branch being articulated in such a way as to control the movement of the deformation of the body, the two rigid parts are diametrically opposite, the insert includes a frame receiving the body of the chamber, wherein the top valve has a projection with respect to the frame, in such a way that, under the effect of pressure exerted on the reservoir, the top valve pivots around an edge of the frame and closes, in such a way as to define a closed dose volume.

According to a second aspect, the invention proposes a container including a deformable container wherein a product is to be packaged and a neck provided with a device according to the invention that is connected to the reservoir.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIGS. 2 to 6 are longitudinal cross-section views (FIGS. 2a, 3a, 4a, 5a, 6a) and perspective views showing the inside of the dosing chamber (FIGS. 2b, 3b, 4b, 5b, 6b) of a dosing device, in the rest state (FIGS. 2a and 2b), after inversion of the dome (FIGS. 3a and 3b), after closing of the top valve (FIGS. 4a and 4b), after compression of the bellows (FIGS. 5a and 5b) and after return to initial position (FIGS. 6a and 6b), this according to a first embodiment of the invention;

FIG. 11 shows the various steps of deformation of a dosing device fixed on an internal member, according to a fourth embodiment of the invention.

DETAILED DESCRIPTION OF THE INVENTION

Figure 1:
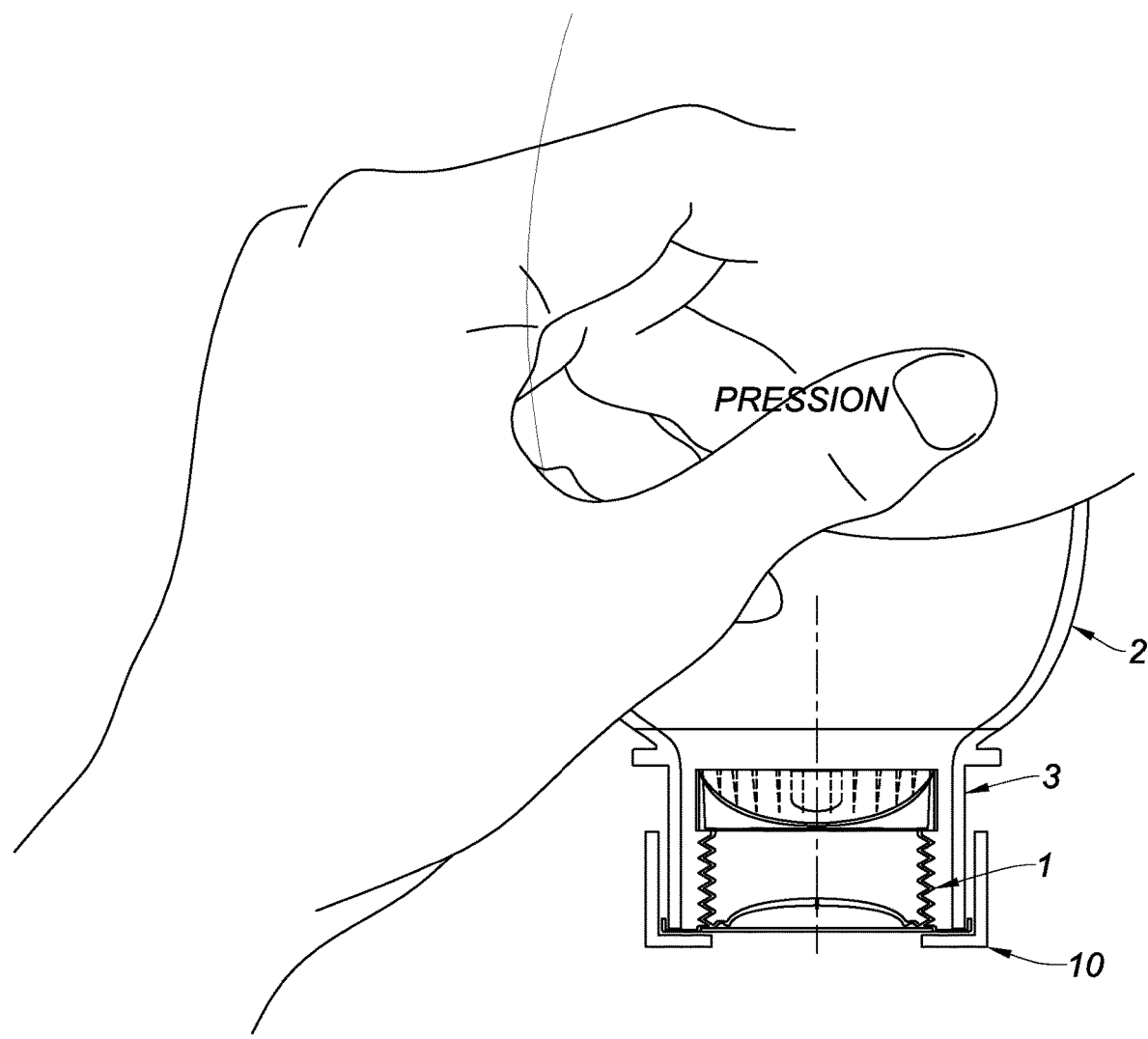
FIG. 1 shows a cross-section view of a container comprising a dosing device, in the rest state, according to an embodiment of the invention.

With reference to FIG. 1, the invention relates to a container comprising a deformable container 2, a rigid neck 3, connected to the reservoir 2, and a dosing device. The term deformable means that the internal volume can be changed, compressed in particular, especially with pressure exerted by a user.

As shown to this effect, the reservoir 2 is configured to be deformed by pressure between the thumb of a hand and the other fingers of the same hand of the user. The reservoir 2 can also be configured to bear against a support and be deformed by any finger of a user. The reservoir 2, for example, comprises a flexible jacket that can be deformed. Its deformability can be ensured by any other means.

With a deformable reservoir 2, it is possible for the user to alter the pressure exerted by the product contained in said reservoir 2 on the dosing device by simply applying manual pressure on the walls thereof.

The dosing device comprises an insert 1, advantageously made of a single part. As such, with the insert 1 being a single part, it can be manufactured using a minimum set of molded parts.

The insert 1, for example, is made from a flexible material, preferably from Polyethylene (PE) materials, with such materials having good properties in terms of reversible deformation or shape memory.

Here, the insert 1 comprises an edge 10 forming a connecting neck and providing the fastening thereof on the neck 3 of the container, in such a way that the neck 3 of the container is positioned inside the edge 10. A plug 30 fastens the two elements together. It is possible to fasten the insert 1 in the neck 3 using another method.

The container is preferably configured to be used by being oriented downwards. In other words, the neck 3 of the container and the dosing device 1 that it receives are placed below the reservoir 2.

In relation to all of the figures, the insert 1 comprises a deformable dosing chamber 11 that is stable at rest, i.e. when no pressure is exerted on the reservoir 2.

The dosing chamber 11 comprises at least one valve 12 allowing for the intake of the product from the reservoir 2 and a valve 13 allowing for the distribution of the product dosed beforehand. In light of the orientation of the container mentioned hereinabove, the valve 12 allowing for the intake of the product is referred to as the "top" valve and the valve 13 allowing for the distribution of the product is referred to as the "bottom" valve. That said, the notions of "top valve" and of "bottom valve" must not be considered as being limiting. Indeed, the dosing device in accordance with the invention, particularly before insertion into the container to which it is intended, is not designed to be oriented in a specific direction. The chamber dosage further comprises a deformable body 14 that connects the top valve 12 to the bottom valve 13.

The dosing chamber 11 is configured so that the bottom valve 13 remains closed when the top valve 12 is open, in such a way that at rest, the product contained in the reservoir 2 can directly access the dosing chamber 11 without leaving the container.

The dosing chamber 11 comprises a first portion that, under the effect of a pressure from the user on the reservoir 2 and following the pressure exerted by the product, is deformed and results in the closing of the top valve 12 and of the dosing chamber 11, while the bottom valve 13 remains closed. The dosing chamber 11 then contains the dose of the product to be dispensed. Indeed, the volume of the dosing chamber is defined by the volume delineated by the top valve 12, the bottom valve 13 and the body 14.

Thereafter, under the effect of the pressure of the product contained in the reservoir 2 which continues to be exerted on the dosing chamber 11, the body 14 is deformed by compression, thereby opening the bottom valve 13 and the dosing chamber 11. The opening of the bottom valve 13 allows the product to be dispensed.

The use of the insert 1 thus allows the industrialist or the preparer to change the conventional dispensing systems fitted on said container with a dosing device.

Figure 2B:
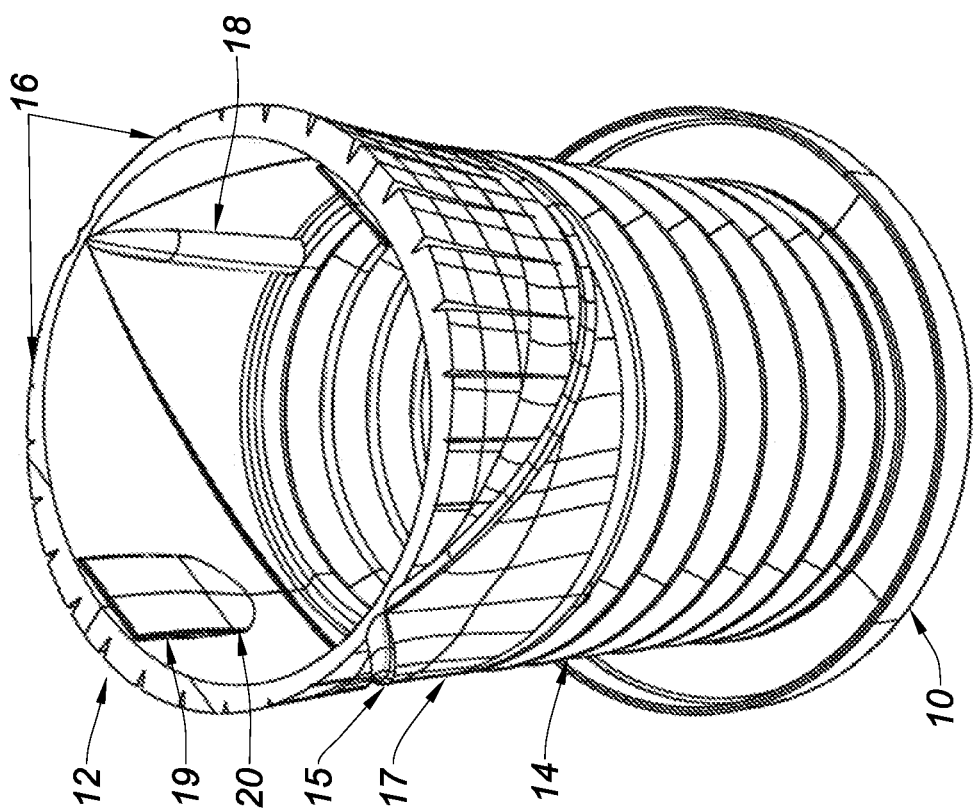
Figure 2A:
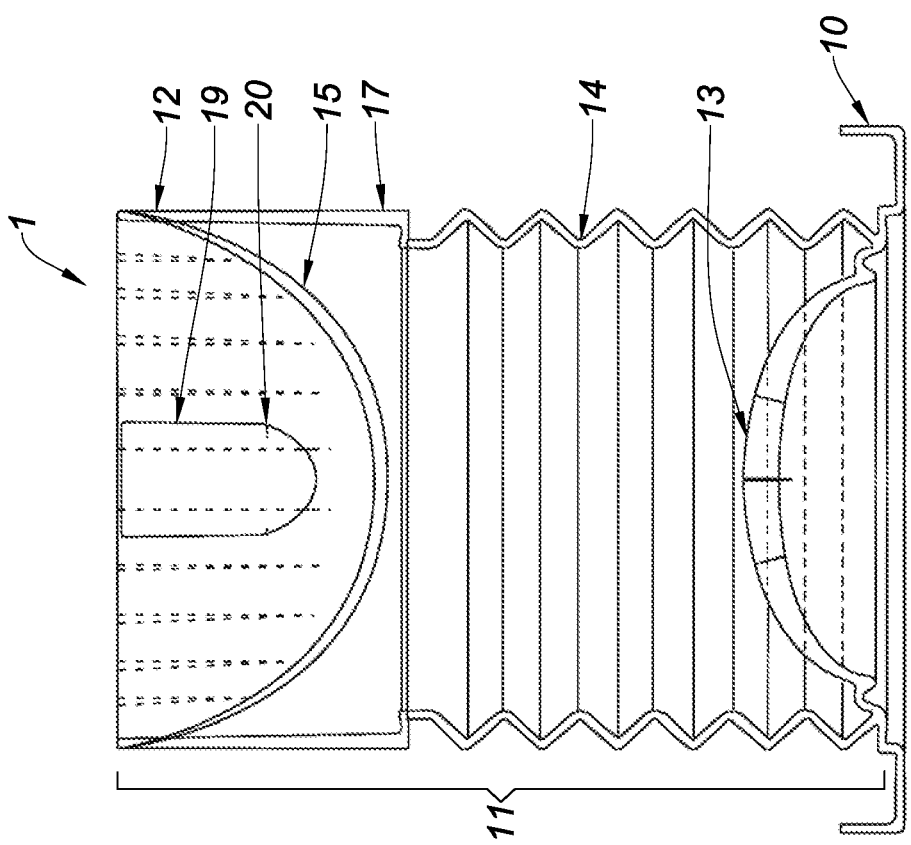

FIGS. 2a and 2b show a dosing device, in the state of rest, according to a first embodiment of the invention. The dosing device comprises an insert 1 with a tubular structure extending around a central longitudinal axis, designed to be oriented vertically when in use.

The dosing chamber 11 comprises a deformable first portion, as announced hereinabove, and an, equally deformable second portion, forming a dome on which the bottom valve 13 is located.

More specifically, the first portion of the chamber 11 can be delineated by lines of weakness 15, along which it can be deformed, and by a free edge.

Advantageously, the lines of weakness 15 are located on an inclined plane in relation to the central longitudinal axis of the insert 1 and thereby form an arc of circle, said circle having a centre representing to the centre of a mouth of the insert 1. Preferably, said lines of weakness are two in number and diametrically opposite each other, in such a way that the first portion of the chamber 11 consists of flaps 16 that can be folded towards one another. The two diametrically opposite flaps 16 formed as such form the top valve 12 of the first portion of the chamber 11.

Advantageously, also, the flaps 16 have a decreasing thickness from their free edge to the lines of weakness 15 and from a median portion of said flaps 16 to a rigid portion 17 of the chamber 11. As such, the thickest sections are used to hold the first portion of the chamber 11 in vertical position around the central longitudinal axis of the insert 1 and provide a good seal of the closing of the top valve 12 in closed position, while the least thick sections, located close to the lines of weakness 15 allow for the deformation of the first portion of the chamber 11 only along the lines of weakness 15, during switchovers between the "at rest" position and the closed position of the flaps 16.

The rigid portion 17 of the chamber 11 providing the verticality of the tubular structure of the chamber 11 is located between the flaps 16 and the body that can be deformed 14. In particular, the rigid portion 17 is delineated by the lines of weakness 15, in such a way that the inclination of said lines of weakness 15 in relation to the longitudinal axis of the insert 1 makes it possible to define, on the rigid portion 17, two diametrically opposite tops. The rigid portion 17 preferably has an excessive thickness with respect to the flaps 16. As such, the rigidity of the rigid portion 17 is not necessarily obtained using a material other than that of the flaps but preferably stems from the geometry of the part.

Advantageously, furthermore, each one of said tops of the rigid portion 17 is located between two adjacent ends of the flaps 16 and rises above a reinforcement line 18, the role of which is to rigidify the chamber 11 on these thinner sections and to provide for the verticality of the tubular structure in conjunction with the rigid portion 17.

Advantageously, in particularly, said flaps 16 can include a deformable member 19 located on their inner walls, said member 19 connected to their inner walls via a zone forming a hinge 20. As such, a lower portion of the member 19 always remains attached to the inner walls of the flaps 16 and therefore, immobile with respect to said flaps 16, while an upper portion of the member 19 can move away from the walls by means of the hinge 20.

The member 19 is configured to be in vertical position, at rest. As such, its entire surface is in direct contact with the inside walls of the flaps 16.

In reference to FIGS. 3a and 3b, under the effect of a movement of the product, the second portion of the chamber 11 is deformed, causing the inversion of the dome on which the bottom valve 13 is located, without opening said valve.

The inversion of the dome creates a rapid displacement of the liquid in the direction of the volume initially occupied by the dome in the chamber 11 and causes the deformation of the member 19, which then moves away from the inner walls of the flaps 16. The inversion of the dome also leads to an increase in the actual volume of the dosing chamber 11.

Advantageously, the member 19 is sufficiently separated from the lines of weakness 15 in order to have a lever action on the flaps 16, and allow for the deformation thereof on the lines of weakness 15. Advantageously, also, the lower portion of the member 19 has a surface that is substantially in contact with the thickest zones of the flaps 16 in order to facilitate the deformation of said flaps.

Here, the members 19 of each one of the flaps 16 are diametrically opposite each other and arranged on an orthogonal diameter or a diameter connecting the tops of the rigid portion 17.

With reference to FIGS. 4a and 4b, by moving away from the inner wall of the flaps 16, the member 19 causes the deformation of said flaps 16 still under the pressure of the product contained in the deformable container 2, and this happens around lines of weakness 15, thereby closing the top valve 12 and the dosing chamber 11, without opening the bottom valve 13. As such, the volume of product dosed corresponds to the volume set by the first portion and the second portion of the chamber 11, the rigid portion 17 and the body 14, in closed position of the flaps 16.

Advantageously, the flaps 16 can comprise grooves 21 separating, at rest, each one of the flaps 16 into several parallel sections, in such a way as to allow the flap to be deformed for the closing of the top valve and to provide a hermetic closing of said top valve 12. At rest, the grooves 21 have an open angle, whereas after closing of the top valve 12, their opposite walls come into contact with one another and the rib then forms an open angle at zero. As such, the closing of the top valve 12 is maintained by blocking the grooves 21 through compression, which prevents the introduction of the product into the chamber 11, after the closing of the top valve 12 and hermetically closes the chamber 11. It is not necessary for the grooves 21 of the flaps 16 to be located facing each other, despite the fact that said flaps are opposite each other.

The body 14 of the chamber 11 can consist of a set of bellows which, at rest, is decompressed. Preferably, the bellows can be cylindrical in shape, albeit not necessarily. During the closing of the chamber 11, the volume set by the bellows is entirely filled with the product.

Thereafter, with reference to FIGS. 5a and 5b, under the effect of the continuous pressure of the product which is now exerted on the outside face of the flaps 16, the bellows is compressed, decreasing the actual volume of the dosing chamber 11.

It should be noted that there can be a state wherein the top valve 12 is not yet closed, the flaps 16 being only partially folded back, and wherein the body 14 starts to be deformed. In this state, the surface of the flaps has a radial component subjected to the pressure of the fluid, which has the effect of triggering off a compression of the bellows.

With the closing of the top valve 12 having hermetically sealed the chamber 11, the compression of the bellows results in an increase in the pressure exerted by the product on the second portion of the chamber 11, the opening of the bottom valve 13 and finally the dispensing of the dose of product contained in the chamber 11. During the compression of the body 14, the first portion is mobile with the body, i.e., the first portion accompanies the body 14 and goes down into the neck of the container.

When the full dose of the product has been dispensed, the user can release the pressure that he is exerting on the container and, the insert 1 returns to its initial configuration for example thanks to its elasticity and/or under the effect of shape memory.

Figure 6B:
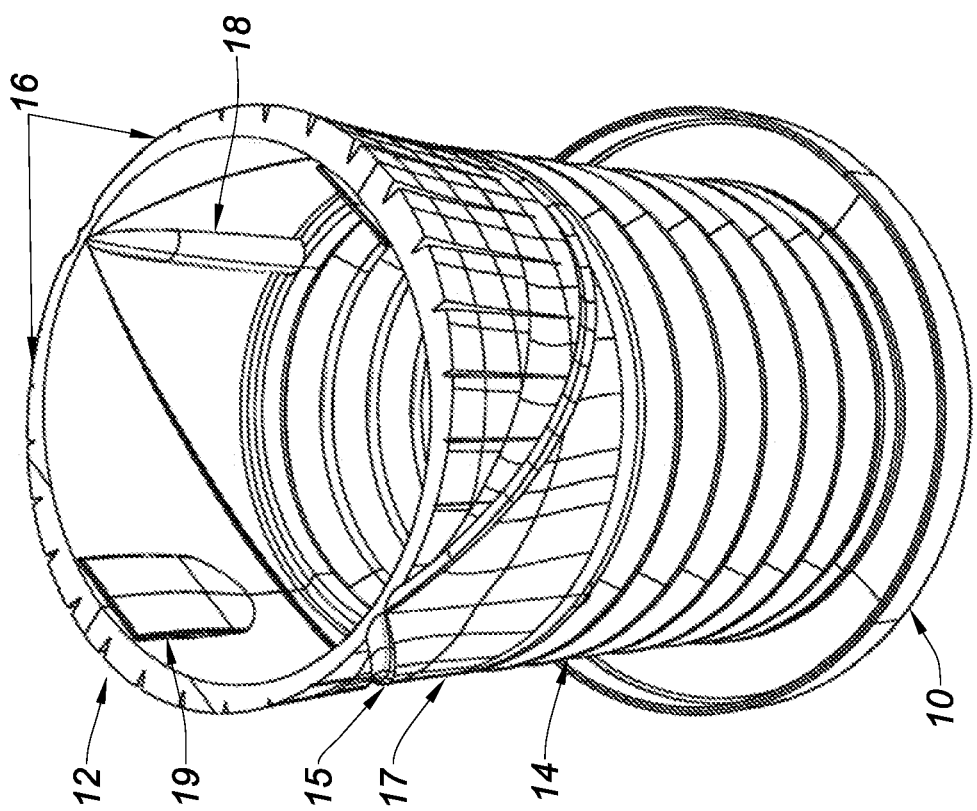
Figure 6A:
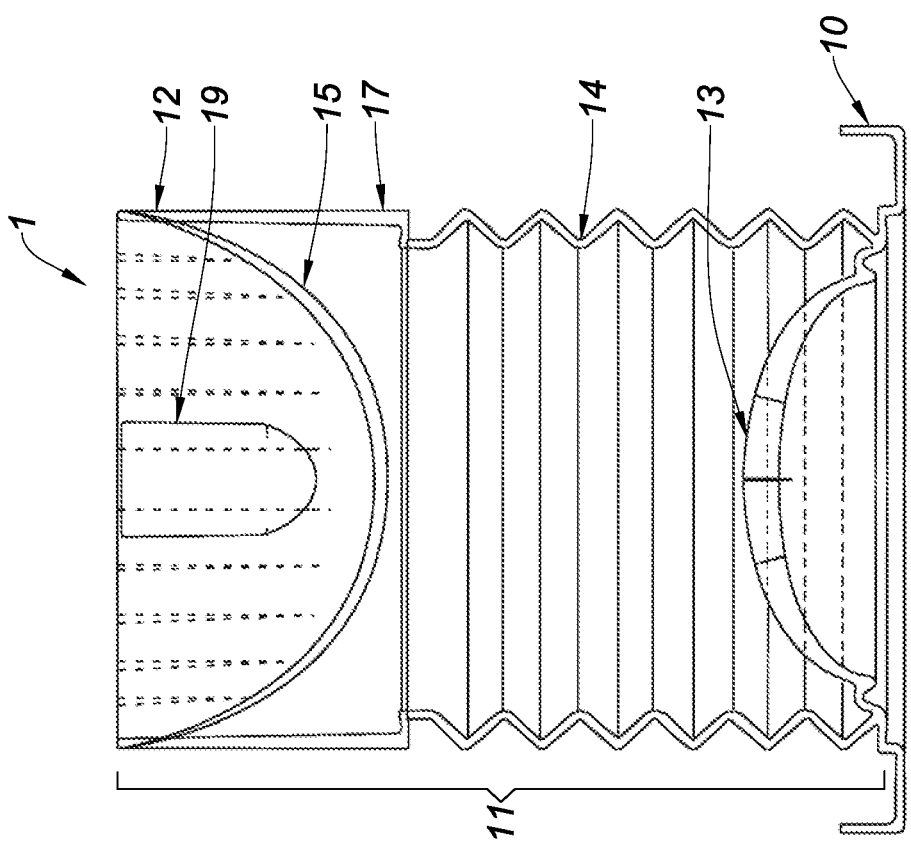

Indeed, with reference to FIGS. 6a and 6b, as long as the user exerts pressure on the container whereas the dispensing of the product is finished, there is a balanced pressure on either side of the bottom valve which closes as a result. Then, when the user releases the pressure, the container increases in volume and a depression is formed in the container. First of all, the top valve opens, causing the depression spread up to the chamber and successively or simultaneously to unfold the body 14 and turn over the dome formed by the bottom valve, which then opens to allow air to flow from outside into the container. When the inside/outside pressure equilibrium is re-established, the bottom valve closes and the system returns accordingly to the configuration shown.

The dose of the product thus dispensed does not depend on the pressure exerted by the user and the viscosity of the product, since it is determined by the volume of the dosing chamber 11. As a result, identical doses of product can be dispensed until the reservoir 2 is completely empty.

Figure 7:
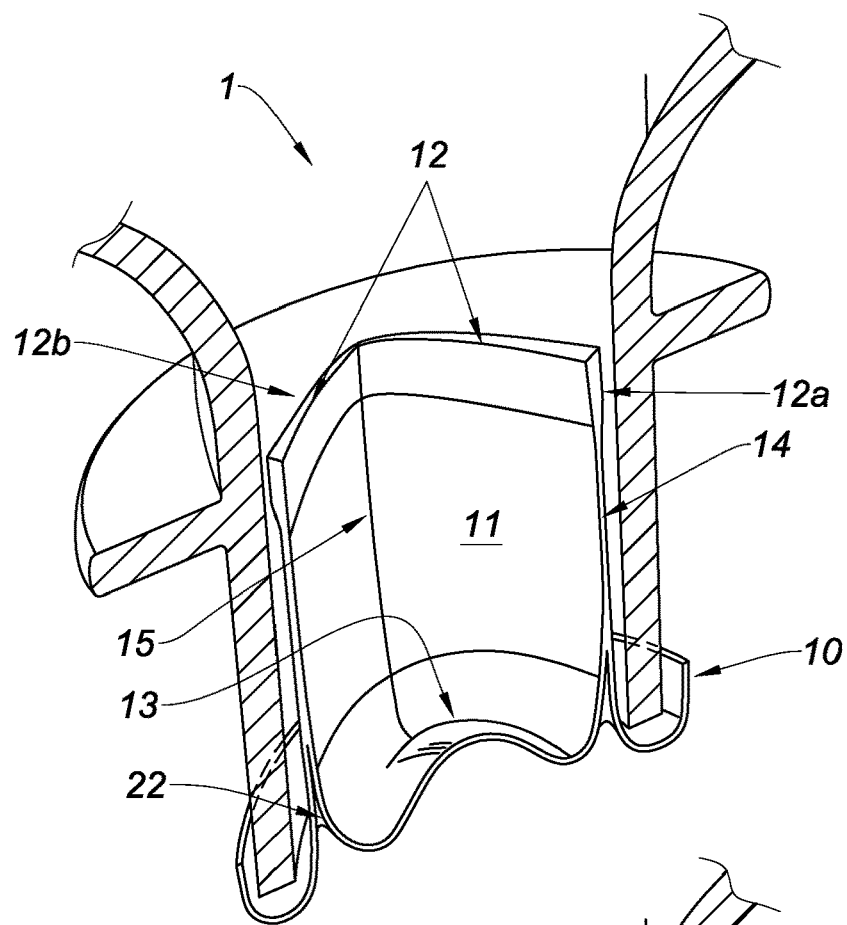
FIGS. 7, 8 and 9 are longitudinal cross-section views of a dosing device, according to a second embodiment of the invention, in the rest state, (FIG. 7), after inversion of the dome (FIG. 8) and after deformation of the body of the chamber (FIG. 9)

FIG. 7 shows a dosing device, in the state of rest, according to a second embodiment of the invention. The dosing device comprises an insert 1 with a tubular structure extending around a central longitudinal axis in the neck 3 of a container.

With reference to FIG. 7, the verticality of the tubular structure is provided by the lines of weakness 15 which are arranged according to the longitudinal axis of the insert 1. Indeed, in this embodiment, the lines of weakness 15 also play the role of lines for guiding the deformation and provide the chamber 11 with its shape, at rest.

The first portion of the chamber 11 is made up of a thick edge 12a, preferably with a rectangular section, but not limited to such a shape, slimming in the direction of the lines of weakness 15 following a tapered line 12b. In particular, the first portion of the chamber 11 is delineated by the free edge of the chamber 11 and by the body 14.

Advantageously, the lines of weakness 15 are two in number and diametrically opposite each other, which makes it possible to form two diametrically opposite edges 12a. In addition, as the thickness of the edges 12a decreases in the direction of the lines of weakness 15, this causes a deformation of the dosing chamber 11 only along lines of weakness 15 and allows the opposite edges 12a to be thrust against one another. As such, the edges 12a form the top valve 12 of the first portion of the chamber 11.

The body 14 has a zone that is thinner than the edge 12a of the first portion and delineated by the edge 12a of the first portion and the bottom valve 13. As the body 14 has a thickness that is thinner than the edge 12a, it can be deformed independently of the edge 12a along lines of weakness 15. Preferably, the body 14 can be cylindrical in shape, albeit not necessarily. It is advantageously of constant thickness.

Advantageously, the dosing chamber 11 can have a zone with an excess thickness 22 that connects the body 14 and the bottom valve 13. As such, in conjunction with the lines of weakness 15, this zone of excess thickness 22 provides the verticality of the tubular structure of the chamber 11. Therefore, at rest, the body 14 has a vertical and open shape that allows the product initially contained in the reservoir 2 to be introduced into the dosing chamber 11 via the top valve 12.

The bottom valve 13 is located on the dome formed in the second portion of the chamber 11. The bottom valve 13 is connected to the reservoir 2 via the edge 10 which, as in the previous case, engages with the connecting neck of the reservoir 2.

Figure 8:
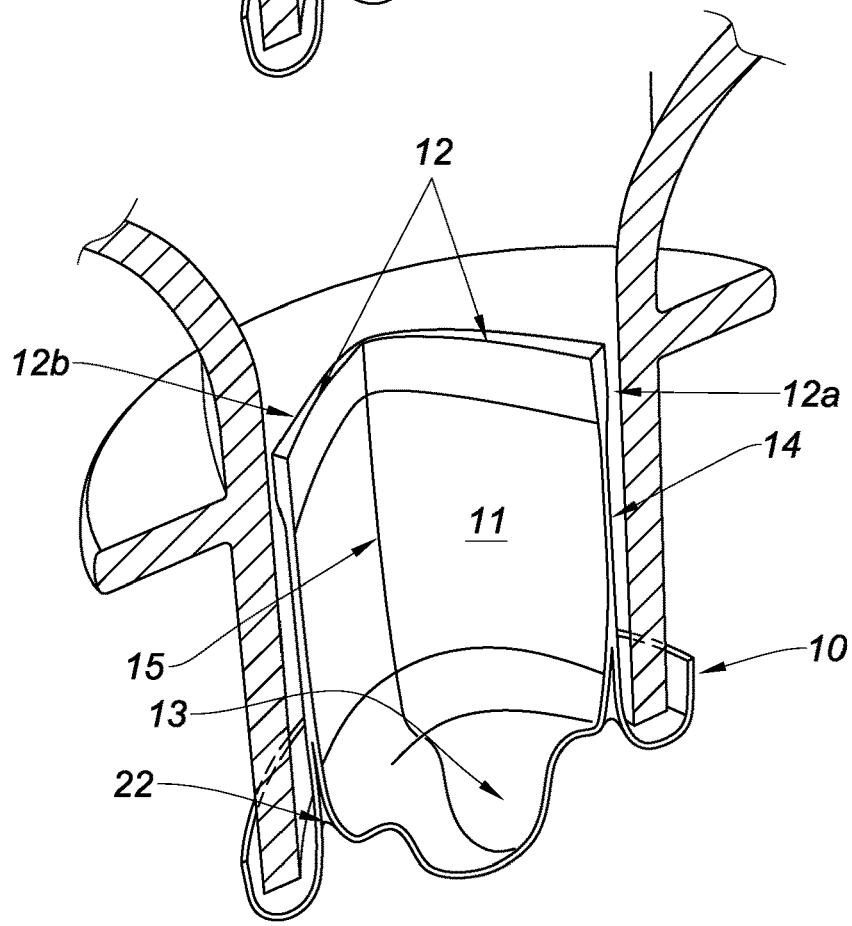

With reference to FIG. 8, under the effect of the pressure exerted by the user on the reservoir 2 and the pressure of the product on the second portion of the chamber 11, the latter is deformed, causing the inversion of the dome, without opening the bottom valve 13 located on the dome.

Figure 9:
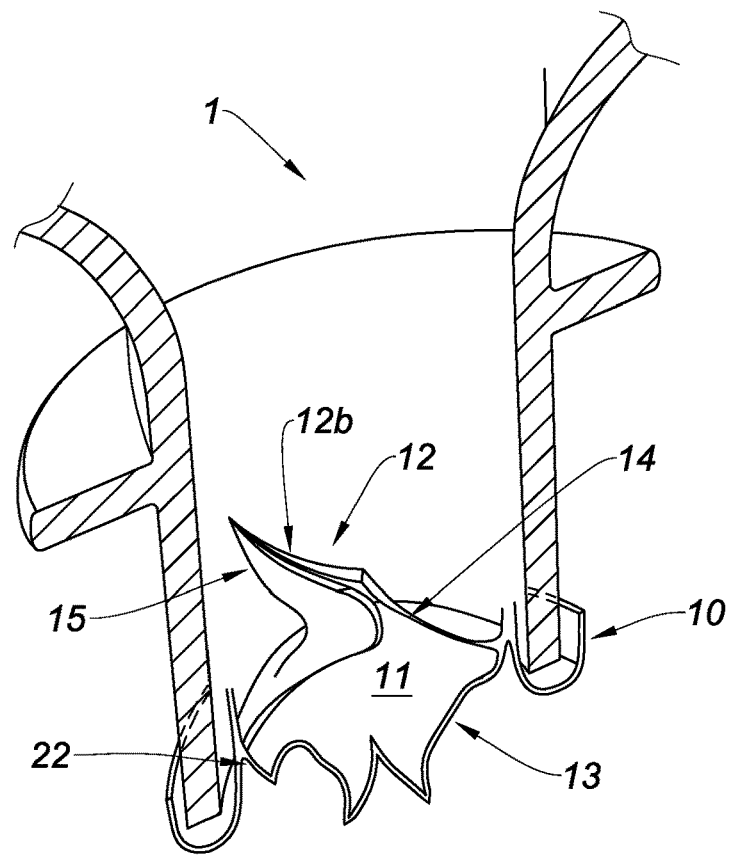

With reference to FIG. 9, during the inversion thereof, the dome exerts a traction force on the excess thickness 22 which causes the deformation of the body 14, from the edge 12a of the first portion along the lines of weakness 15 and the tapered line 12b. During the deformation of the body 14, the opposite edges 12a, are thrust against one another, causing the closing of the top valve 12 and the closing of the dosing chamber 11, without opening the bottom valve 13. A predetermined volume of product is ready to be dispensed.

Still under the effect of the continuous pressure exerted on the reservoir 2, the product exerts a force on the outer face of the thin walls of the body 14 and, constrained by the connecting neck 10, the body 14 will seek to become flat and fall randomly on one side or the other of the insert 1. The pressure exerted by the product on the second portion of the chamber 11 then causes the opening of the bottom valve 13, almost simultaneously with the deformation movement of the body 14. The dose of the product contained in the chamber 11 is thus dispensed Similar to the first embodiment, when the user releases the pressure exerted on the container, the dosing chamber 11 then returns to its initial configuration.

In this embodiment, as the deformation movement of the chamber 11 is random, the volume of product dosed can undergo slight variations from one application to another. On the other hand, the dose of product dispensed nonetheless actually remains independent of the pressure exerted by the user and of the viscosity of the product.

Very advantageously, the dosing chamber 11 can be provided with two opposite rigid parts 23. The rigid parts 23 are arranged in a manner to specifically control the deformation movement of the chamber 11 and the thrusting of the edges 12a.

Figure 10:
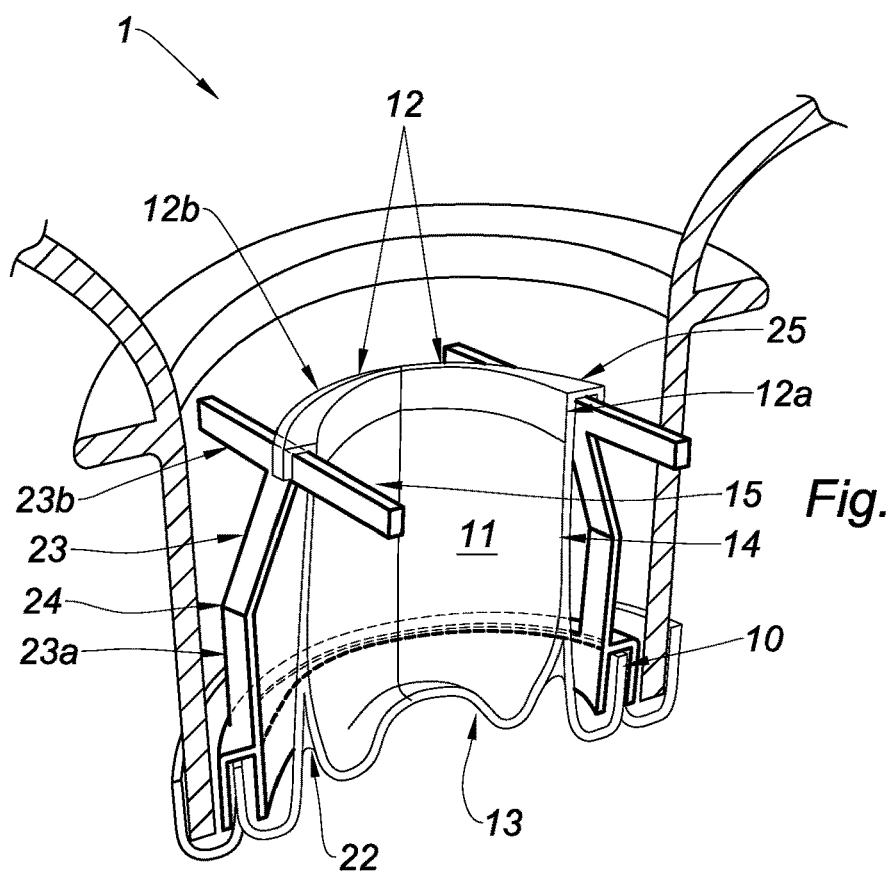
FIG. 10 is a longitudinal cross-section view of a dosing device, at rest, comprising rigid parts for controlling the deformation of the dosing chamber according to a third embodiment of the invention.

FIG. 10 shows a dosing device, in the rest state, comprising two of said rigid parts 23, according to a third embodiment of the invention.

It will be advantageous that a clearance be arranged between the edge 12a and the neck 3 of the container in order to favor the detaching of said edge 12a at the beginning of the deformation of said edge 12a, this under the effect of the pressure of the product located in the clearance.

Each rigid part 23 comprises a hinge 24, delimiting a support branch 23a extending vertically from the connecting neck of the edge 10 of the chamber, said support branch 23a being configured to be parallel to the support branch 23a of the opposite rigid part 23, and a main branch 23b vertically arranged in a manner to control the deformation movement of the body 14. Here the main branch 23b has a T-shaped configuration with a distal portion linked to the edge 12a and a proximal portion linked to the hinge 24.

Advantageously, the chamber 11 can include a reinforcement structure 25, of tubular shape which allows for a tangential fastening of the distal portion of the main branches 23b of the two rigid parts 23. As the reinforcement structure 25 forms a connection with the edges 12a of the first portion of the chamber 11, it can be moulded directly during the manufacture of the dosing chamber, which is made from a single piece.

Advantageously, the rigid parts 23 are made of a deformable and bend-resistant material, more preferably polypropylene (PP).

As a result, under the effect of the pressure exerted on the reservoir 2, the traction force exerted on the excess thickness 22 following the inversion of the dome, causes a controlled deformation of the body 14 by simultaneous bending of the support branches 23a on edge 10 and of the main branches 23b on hinges 24, which shift from a practically vertical position to an inclined position.

Thereafter, constrained by the connecting neck of the edge 10, the body 14 seeking to become flat, the support 23a and main 23b branches are further inclined and shift from an inclined position to a practically horizontal position, in such a way that the distal portions of the main branches 23b are thrust against one another. As the distal portion of the branches 23b is tangential to the reinforcement structure 25 on edges 12a, the latter come into contact with one another by accurately following a diameter of the insert 1. This causes the closing of the top valve 12 and the closing of the dosing chamber 11, without opening the bottom valve 13. The chamber 11 then contains a determined dose of product.

Similar to the second embodiment, the pressure exerted by the product on the second portion of the chamber 11 causes the compression of the chamber, the opening of the bottom valve 13 and the dispensing of the dose of product contained in the chamber 11. By returning to its initial configuration, the chamber 11 allows the rigid parts 23 to return to their initial position.

FIG. 11 shows an alternative to the dosing chamber 11 in accordance with the invention and its various steps of deformation. Here the insert of the dosing device comprises a frame 26 designed to be attached to the neck 3 of the container. Said frame 26 is annular.

The dosing chamber 11 comprises a top valve 12, a body 14, preferably cylindrical, but not limited to this shape only, and a bottom valve 13.

The dosing chamber 11 is fixed on the frame 26 which is located on body 14 of the chamber 11. The frame 26 is incorporated into the neck 3 of the container, in such a manner to control the deformation movement of the first portion of the chamber 11.

Indeed, at rest, the top valve 12 of the first portion of the chamber 11 is projecting in relation to the body 14 and extends beyond the frame 26. The top valve 12 comprises flaps 27 located on a plane that is inclined in relation to the longitudinal axis of the insert 1 and comes into contact with the frame 26. At rest, as the flaps 27 are not in contact, a space exists between the flaps 27, which allows the product contained in the reservoir 2 to flow into the dosing chamber 11.

Advantageously, the flaps 27 are two in number and opposite each other, in such a way that under the effect of a pressure exerted on the reservoir 2, the two flaps 27 of the first portion of the chamber 11 pivot around an edge of the frame 26 and come into contact with one another, closing the top valve 12 and the dosing chamber 11. As the dosing chamber 11 has a closed volume, it contains a predetermined dose of product.

Under the continuous pressure exerted on the container, the product contained in the reservoir 2 exerts pressure on the first portion of the chamber 11 and progressively compresses the body 14, decreasing its actual volume.

Simultaneously, the bottom valve 13 opens and allows for the dispensing of the product dosed beforehand.

Once the volume of the dosed product is entirely dispensed, the dosing chamber 11 is depressed. The flaps 27 are then sufficiently inclined to cause the opening of the top valve 12 and allow for a suction of air into the dosing chamber 11, which returns to its initial configuration.

The operation can be replicated in a manner to distribute repeatable doses of product independently of the pressure exerted by the user on the container or of the viscosity of the product.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

What is claimed is:

1. A dosing device configured to equip a container comprising a deformable container containing a product, said device comprising an insert, said insert comprising a dosing chamber adapted to be deformed by pressure of the product coming from the reservoir, said dosing chamber comprising:
    a top valve for intake of the product from the reservoir, the top valve being open in an at rest position;
    a bottom valve dispensing the product;
    a deformable body connecting the top valve and the bottom valve;
    the dosing chamber being configured so that, under the pressure of the product coming from the reservoir, the top valve is closed by the deformation of a first portion of the chamber, the bottom valve remaining closed, then the bottom valve opens under the effect of the deformation of the body.

2. The dosing device of claim 1, wherein a second portion of the chamber forms a dome, said bottom valve being on said dome.

3. The dosing device of claim 1, wherein the dosing chamber comprises lines of weakness, said dosing chamber being deformable along said lines of weakness in order to form the first part of the chamber.

4. The dosing device of claim 3, wherein said first portion comprises flaps that can be folded towards one another, delineated by the lines of weaknesses located on an inclined plane with respect to a longitudinal axis of the insert.

5. The dosing device of claim 4, wherein the flaps have a decreasing thickness from a free edge to the lines of weakness and/or from a median portion of said flaps to a rigid portion of the chamber.

6. The dosing device of claim 5, wherein said rigid portion of the chamber comprises tops arranged as to rise above a reinforcement line.

7. The dosing device of claim 4, wherein each one of said flaps comprises a deformable member located on its inner wall, said member being connected to the inner wall by a zone forming a hinge.

8. The dosing device of claim 7, wherein said member is configured to be along the flaps, at rest, and to move away from the inner wall under the effect of a movement of the product in a manner to deform the flaps on the lines of weakness, such that the flaps come into contact with one another, thereby closing the top valve and the dosing chamber.

9. The dosing device of claim 8, wherein said flaps comprise grooves separating at rest each one of the flaps into several sections thus allowing the flap to be deformed.

10. The dosing device of claim 1, wherein the body of the dosing chamber consists of a set of bellows.

11. The dosing device of claim 1, wherein the dosing chamber also comprises an edge that fastens the dosing chamber to the neck of the reservoir.

12. The dosing device of claim 3, wherein:
    the lines of weakness are arranged along a longitudinal axis of said insert;
    the first portion of the chamber is made up of an edge slimming in the direction of the lines of weakness following a tapered line; and,
    the body has a zone that is thinner than the edge of the first portion and delineated by the edge of the first portion and the bottom valve.

13. The dosing device of claim 12, wherein the dosing chamber further comprises an excess thickness between the body and the bottom valve.

14. The dosing device of claim 13, wherein the body:
    has, at rest, a straight shape in a manner to allow the product to be introduced into the dosing chamber via the top valve; and
    is deformed, under the effect of the pressure exerted by the product, from the edge of the first portion along the lines of weakness and the tapered line, said body being constrained by the zone of the excess thickness.

15. The dosing device of claim 12, wherein the dosing chamber comprises two opposite rigid parts, said rigid parts each having a hinge delineating:
    a support branch, said support branch of a first of said parts being configured to be parallel to the support branch of the opposite rigid part by extending along the body; and
    a main branch being articulated in a manner to control the movement of deformation of the body.

16. The dosing device of claim 1, wherein the insert comprises a frame receiving the body of the chamber, and wherein the top valve is projecting with respect to said frame, such that, under the effect of pressure exerted on the reservoir, the top valve pivots around an edge of the frame and closes, in a manner to determine a closed dose volume.

17. The dosing device of claim 1, wherein the insert is made from a single piece.

18. The dosing device of claim 1, wherein the insert is made from an elastomer material.

19. A container comprising a deformable reservoir in which a product is to be packaged and a neck fitted with a dosing device connected to said reservoir and configured to equip the container, said device comprising an insert, said insert comprising a dosing chamber adapted to be deformed by pressure of the product coming from the reservoir, said dosing chamber comprising:
- a top valve for intake of the product from the reservoir, the top valve being open in an at rest position;
- a bottom valve dispensing the product;
- a deformable body connecting the top valve and the bottom valve;
- the dosing chamber being configured so that, under the pressure of the product coming from the reservoir, the top valve is closed by the deformation of a first portion of the chamber, the bottom valve remaining closed, then the bottom valve opens under the effect of the deformation of the body.

20. The device of claim 1, wherein the chamber comprises a second portion which is deformed before the deformation of the first portion.

\* \* \* \* \*